2,948,755
PREPARATION OF AROMATIC AMINES

Louis Schmerling, Riverside, Ill., assignor, by mesne assignments, to Universal Oil Products Company, Chicago, Ill., a corporation of Delaware No Drawing. Filed Mar. 7, 1958, Ser. No. 719,763

10 Claims. (Cl. 260—581)

This application is a continuation-in-part of my copending application Serial No. 658,008, filed May 9, 1957, now abandoned.

This invention relates to a process for the introduction of amino groups into aromatic compounds and particularly to a process for aminating an aromatic hydrocarbon. More particularly the invention is directed to a process for preparing aniline.

The aminated aromatic compounds which are prepared according to the process of this invention are useful as intermediates in the preparation of other chemical compounds of varied uses. For example, the use of aniline as an intermediate in the preparation of dyes is well known in the art, among which is the production of aniline black by reacting aniline with chlorides in the presence of certain metallic salts; polymethylanilines which are used in the preparation of azo dyes; indo-anilines which may be used as blue dyes; the production of a green dye, emeraldin, from the oxidation of aniline with an aqueous alkaline solution to form quinone monophenyl diamine, which upon polymerization with a mineral acid, forms the aforementioned emeraldin; the preparation of aniline black by oxidizing aniline salts with potassium dichromate, ammonium persulfate, etc. in the presence of oxygen carriers such as copper sulfate, potassium ferrocyanide, etc. It may also be acetylated to acetanilide which finds medicinal use.

In addition to the above, aniline may be used as an intermediate in the preparation of compounds of the N,N'-dialkyl-p-phenylenediamine type which are used to inhibit the oxidation of various organic materials which are normally subject to oxidative deteriorations, such materials including motor fuel, particularly unsaturated gasolines as, for example, cracked gasoline and polymer gasolines, diesel oil, mineral oil, lubricating oil, fuel oil, drying oil, greases, rubber, monomers such as styrene, butadiene, etc., paraffin waxes, edible fats and oils such as linseed oil, menhadin oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils, etc. These materials are adversely effected by oxygen, with the resultant formation of undesirable gum, discoloration, rancidity or other deleterious reactions. Therefore, certain substances must be added to the aforementioned organic materials which tend to stabilize said materials and delay or prevent the undesired reactions from occurring among which are the aforementioned antioxidants of the N,N'-dialkyl-p-phenylenediamine type.

Heretofore, prior art methods for preparing aromatic amines such as aniline have disclosed the reaction of an aromatic compound such as benzene with ammonia in the presence of a metal or metallic oxide to produce the desired aromatic amine. One prior art method discloses the use of a metal catalyst such as molybdenum composited on a metallic oxide such as alumina which acts as a carrier for the metal catalyst. Other prior art methods of preparing the desired aromatic amine also disclose the use of a metallic oxide catalyst per se, while yet others disclose the use of an aromatic halide such as chlorobenzene which is reacted with ammonia in the presence of a mixture of a metal of group V or group VI of the periodic table and one of the metals such as copper, cobalt, nickel and iron. Still others have used an aromatic halide such as chlorobenzene with a nickel catalyst on a carrier, the function of said carrier being to fix the hydrogen chloride which is evolved during the reaction.

It has now been discovered that aromatic amines may be prepared by reacting an aromatic compound and particularly an aromatic hydrocarbon with ammonia in the presence of a catalyst which comprises a compound of a metal of group VIB of the periodic table and a promoter consisting of an easily reducible metallic oxide of the type hereinafter set forth at elevated temperatures and pressures to thus obtain a correspondingly greater yield of the desired aromatic amine.

It is therefore an object of this invention to aminate aromatic compounds by reacting said compounds with ammonia in the presence of certain catalysts possessing dehydrogenation activity and a promoter.

A further object of this invention is to obtain greater yields of a desired aromatic amine by reacting the corresponding aromatic compound with ammonia in the presence of certain metallic oxide catalysts and a promoter consisting of an easily reducible metallic oxide.

One embodiment of this invention is found in a process for the preparation of an aromatic amine which comprises reacting an aromatic compound with ammonia in the presence of a catalyst comprising compounds of a metal of group VIB of the periodic table and a promoter consisting of an easily reducible metallic oxide at elevated temperatures and pressures, and recovering the resultant aromatic amine.

A further embodiment of this invention resides in a process for the preparation of an aromatic amine which comprises reacting an aromatic hydrocarbon with anhydrous ammonia in the presence of a catalyst comprising molybdenum oxide and a promoter consisting of an easily reducible metallic oxide at a temperature in the range of from about 400° to about 500° C. and at a pressure in the range of from about atmospheric to about 200 atmospheres, and recovering the resultant aromatic amine.

A specific embodiment of the invention is found in a process for the preparation of aniline which comprises reacting benzene with anhydrous ammonia in the presence of molybdenum oxide and a promoter consisting of cupric oxide at a temperature in the range of from about 400° to about 500° C. and at a pressure in the range of from about atmospheric to about 200 atmospheres, and recovering the resultant aniline.

Other objects and embodiments referring to alternative catalysts, promoting agents and aromatic compounds will be found in the following further detailed description of the invention.

As hereinbefore set forth it has now been discovered that the amination of aromatic hydrocarbons such as benzene may result in greater yields of the desired aromatic amine by reacting the aromatic hydrocarbon with anhydrous ammonia in the presence of catalysts comprising compounds of a metal of group VIB of the periodic table and a promoter comprising easily reducible metallic oxides. These easily reducible metallic oxides perform the function of being hydrogen acceptors to thus remove the hydrogen produced and cause the reaction to proceed in the desired direction rather than allowing the direction to reverse and thus regenerate the aromatic hydrocarbon and ammonia. In addition it has also been found useful to carry out the reaction in the presence of a low pressure of air or an oxygen-containing gas. The purpose of this air or oxygen-containing gas is to assist the promoter in removing the hydrogen which is formed simultaneously with the formation of the aromatic amine and, as hereinbefore set forth, is capable of reconverting the newly formed aromatic amine to the aromatic hydrocarbon and ammonia. By pressuring in air or an oxygen-containing gas the hydrogen formed during the reaction will combine with the oxygen and will be removed as water, which is easily separable from the aromatic amine by fractional distillation, thereby greatly increasing the yield of the desired product.

Suitable catalysts which may be used in the amination of aromatic hydrocarbons include ammonium molybdate, ammonium thiomolybdate, molybdenum oxide, molybdenum disulfide, molybdenum trisulfide, molybdenum tetrasulfide, molybdenum dibromide, molybdenum tribromide, molybdenum tetrabromide, molybdenum dichloride, molybdenum trichloride, molybdenum tetrachloride, molybdenum dinitrate, molybdenum trinitrate, ammonium tungstate, ammonium thiotungstate, tungsten dioxide, tungsten trioxide, tungsten dsulfide, tungsten trisulfide, tungsten dibromide, tungsten tetrabromide, tungsten pentabromide, tungsten dichloride, tungsten tetrachloride, tungsten pentachloride, tungsten dinitrate, tungsten tetranitrate, ammonium chromate, ammonium thiochromate, chromium dioxide, chromic oxide, chormous oxide, chromic disulfide, chromous sulfide, chromic sulfate, chromous sulfate, chromic bromide, chromous bromide, chromic chloride, chromous chloride, chromic nitrate, chromous nitrate, etc. Easily reducible metallic oxides which may be used as promoters within the scope of this invention include cuprous oxide, cupric oxide, ferrous oxide, ferric oxide, nickelous oxide, nickellic oxide, silver oxide, gold oxide, etc.

Aromatic hydrocarbons which may be reacted with anhydrous ammonia in the present process include benzene; polycyclic aromatic hydrocarbons such as biphenyl, naphthalene, anthracene, chrysene, phenanthrene, pyrene, etc.; alkyl benzenes such as toluene, ethylbenzene, propylbenzene, etc., o-xylne, m-xylene, p-xylene, o-diethylbenzene, m-diethylbenzene, p-diethylbenzene, etc. It is to be understood that the aforementioned aromatic hydrocarbons are only representative of the class of compounds which may be used, and that the present invention is not necessarily limited thereto.

The reaction conditions at which the process of this invention is carried out will depend upon the particular reactants and catalysts which the used therein. In general, elevated temperatures in the range of from about 200° to about 600° C. will be employed, and in addition, superatmospheric pressures ranging from about atmospheric to about 200 atmosphere or more may be used, the pressure used being sufficient to maintain at least a portion of the reactants in the liquid phase. However, in some cases, again depending upon the particular reactants and catalysts used, it will be advantageous to use subatmospheric pressure. The pressures used are generally supplied by the ammonia and, if so desired, an inert gas such as nitrogen.

The process of this invention may be effected in any suitable manner and may comprise either a batch or a continuous type operation. For example, when a batch type operation is used a quantity of the aromatic compound and the catalyst is placed in an appropriate apparatus such as a rotating autoclave. The autoclave is sealed and anyhdrous ammonia is pressured in while the apparatus is heated to the desired temperature. After a predetermined period of time has elapsed the apparatus and contents thereof are cooled to room temperature, the excess pressure vented and the desired reaction product, comprising the aminated aromatic compound is separated from any unreacted aromatic compound by conventional means, such as, fractional distillation, etc.

The process of this invention may also be effected in a continuous type operation. In one such type the catalyst is disposed as a fixed bed in a reactor which is maintained at the proper operating conditions of temperature and pressure. The reactor may comprise an unpacked vessel or coil or may be lined with an adsorbent packing material such as fire brick, dehydrated bauxite, alumina, or the like. The ammonia and aromatic compound are continuously charged to said reactor at a liquid hourly space velocity in the range of from about 0.1 to about 10 (liquid hourly space velocity being defined as the volume of liquid hydrocarbon per volume of catalyst per hour) and pass through the bed of catalyst in either an upward or downward flow. It is contemplated within the scope of this invention that the aromatic compound and the ammonia may be charged to the reactor through separate means or may be admixed prior to entry and charged to said reactor in a single stream. After a predetermined residence time has elapsed the desired reaction product is continuously withdrawn from the reactor, and separated from the reactor effluent, the latter being recycled to form a portion of the feed stock while the former is purified by conventional means.

Another type of continuous operation which may be used in this invention comprises a moving bed operation in which the catalyst and the reactants pass either concurrently or countercurrently to each other. Still another type of operation which may be used is the slurry type in which the catalyst is carried into the reactor as a slurry in the aromatic compound.

The following examples are given to illustrate the process of the present invention, which, however, are not intended to limit the generally broad scope of the present invention in strict accordance therewith.

*Example I*

Five grams of a molybdenum trisulfide catalyst and 10 g. of copper oxide in the form of powder along with 50 g. of benzene were placed in a glass liner of a rotating autoclave. The liner was sealed in the autoclave and ammonia pressured in at an initial pressure of about 10 atmospheres along with nitrogen to bring the initial pressure to 30 atmospheres. The autoclave was heated to a temperature of about 400° C. and maintained thereat for a period of about 3 hours. During this time the pressure in the autoclave rose to 183 atmospheres. At the end of the reaction time the autoclave and contents thereof were cooled to room temperature, the final pressure at room temperature being 30 atmospheres. The excess pressure was vented and the reaction product, comprising aniline, was separated by decanting the liquid product from the catalyst and distilling it. It may be stated that, there being little side reaction, the yield of aniline was practically quantitative based on the reacted benzene.

When this experiment was repeated, but in the absence of the copper oxide, the yield of aniline was substantially lower.

*Example II*

Ten grams of a molybdenum disulfide catalyst and 10 g. of copper oxide in the form of wire along with 50 g. of benzene were placed in a glass liner of a rotating autoclave. The liner containing the benzene and catalyst was sealed into the autoclave and ammonia (60 g.) and nitrogen pressured in until an initial pressure of about 30 atmospheres was reached. The autoclave was heated at a temperature of about 400° C. for 2.5 hours. During this time the pressure reached a maximum of 285 atmospheres. At the end of the reaction time the autoclave and contents thereof were cooled to room temperature, the final pressure at room temperature being 30 atmospheres. The excess pressure was vented and the desired aniline was separated from unreacted benzene and catalyst.

*Example III*

A further experiment was performed in which air was added to the reaction mixture, the purpose of the addition being to remove the hydrogen which was formed simultaneously with the aniline and which is capable of converting the aniline to benzene and ammonia. By removing said hydrogen the equilibrium of the reaction:

$$C_6H_6 + NH_3 \rightleftharpoons C_6H_5NH_2 + H_2$$

is shifted to the right, thereby increasing the yield of aniline. In this experiment 10 g. of a catalyst comprising molybdenum oxide and 10 g. of cupric oxide in the form of wire along with 50 g. of benzene were placed in a glass liner of a rotating autoclave. The liner was sealed into the autoclave and 22 g. of ammonia was pressed in bringing the pressure to 10 atmospheres. Air was then pressed into the autoclave to a total pressure of 27 atmospheres. The autoclave was heated at 400° C. for a period of about 3.5 hours, the maximum pressure at this time reaching 140 atmospheres. At the end of this time the autoclave and contents thereof were cooled to room temperature, the final pressure being 22 atmospheres at room temperature. The excess pressure was vented and the reaction products comprising a water-white liquid and a minor amount of bluish aqueous liquid over a dark catalyst powder plus copper-colored particles were recovered, separated and the benzene layer was subjected to fractional distillation to obtain the desired product, aniline.

*Example IV*

A mixture of 10 g. of an ammonium molybdate catalyst and 10 g. of copper oxide wire along with 50 g. of benzene is placed in a glass liner of a rotating autoclave. The liner is sealed into the autoclave and 30 g. of ammonia is pressured in at an initial pressure of about 10 atmospheres. The autoclave is heated to a temperature of about 475° C. and maintained thereat for a period of about 3 hours. At the end of this time the autoclave and contents thereof are cooled to room temperature, the final pressure being about 10 atmospheres. The excess pressure is vented and the reaction product, comprising aniline, is separated from unreacted benzene and catalyst and recovered.

*Example V*

A mixture of 10 g. of an ammonium tungstate catalyst and 10 g. of copper oxide wire along with 50 g. of benzene is placed in a glass liner of a rotating autoclave. The liner is sealed into the autoclave, after which 45 g. of ammonia is pressured in at an initial pressure of about 10 atmospheres, followed by sufficient air to bring the total pressure to about 30 atmospheres. The autoclave is heated to a temperature of about 450° C. and maintained thereat for a period of 3 hours. At the end of this time the autoclave and contents thereof are cooled to room temperature, the final pressure being about 24 atmospheres. The excess pressure is vented and the reaction product, comprising aniline is separated from unreacted benzene and catalyst and recovered.

*Example VI*

A mixture of 10 g. of a molybdenum oxide catalyst and 10 g. of nickellic oxide powder along with 50 g. of benzene is placed in a glass liner of a rotating autoclave. The liner is sealed into the autoclave and ammonia (30 g.) and nitrogen are pressured in at an initial pressure of about 40 atmospheres. The autoclave is heated to a temperature of about 400° C. and maintained thereat for a period of about 3.5 hours. At the end of this time the autoclave and contents thereof are cooled to room temperature, the final pressure at this temperature being 40 atmospheres. The excess pressure is vented and the reaction product, comprising aniline is separated from any unreacted benzene and catalyst and recovered.

I claim as my invention:

1. A process which comprises reacting an aromatic hydrocarbon selected from the group consisting of benzene and alkyl benzenes with anhydrous ammonia in the presence of a compound of a metal selected from the group consisting of molybdenum, tungsten and chromium and an easily reducible oxide of a metal selected from the group consisting of copper, iron, nickel, silver and gold at a temperature in the range of from about 200° to about 600° C. and at a pressure in the range of from about atmospheric to about 200 atmospheres, and recovering the resultant aromatic amine.

2. A process which comprises reacting an aromatic hydrocarbon selected from the group consisting of benzene and alkyl benzenes with anhydrous ammonia in the presence of ammonia molybdate and an easily reducible oxide of a metal selected from the group consisting of copper, iron, nickel, silver and gold at a temperature in the range of from about 400° to about 500° C. and at a pressure in the range of from about atmospheric to about 200 atmospheres, and recovering the resultant aromatic amine.

3. A process which comprises reacting an aromatic hydrocarbon selected from the group consisting of benzene and alkyl benzenes with anhydrous ammonia in the presence of molybdenum oxide and an easily reducible oxide of a metal selected from the group consisting of copper, iron, nickel, silver and gold at a temperature in the range of from about 400° to about 500° C. and at a pressure in the range of from about atmospheric to about 200 atmospheres, and recovering the resultant aromatic amine.

4. A process which comprises reacting an aromatic hydrocarbon selected from the group consisting of benzene and alkyl benzenes with anhydrous ammonia in the presence of molybdenum trisulfide and an easily reducible oxide of a metal selected from the group consisting of copper, iron, nickel, silver and gold at a temperature in the range of from about 400° to about 500° C. and at a pressure in the range of from about atmospheric to about 200 atmospheres, and recovering the resultant aromatic amine.

5. A process which comprises reacting an aromatic hydrocarbon selected from the group consisting of benzene and alkyl benzenes with anhydrous ammonia in the presence of ammonium tungstate and an easily reducible oxide of a metal selected from the group consisting of copper, iron, nickel, silver and gold at a temperature in the range of from about 400° to about 500° C. and at a pressure in the range of from about atmospheric to about 200 atmospheres, and recovering the resultant aromatic amine.

6. A process which comprises reacting an aromatic hydrocarbon selected from the group consisting of benzene and alkyl benzenes with anhydrous ammonia in the presence of chromium trisulfide and an easily reducible oxide of a metal selected from the group consisting of copper, iron, nickel, silver and gold at a temperature in the range of from about 400° to about 500° C. and at a pressure in the range of from about atmospheric to about 200 atmospheres, and recovering the resultant aromatic amine.

7. A process for the preparation of aniline which comprises reacting benzene with anhydrous ammonia in the presence of ammonium molybdate and cupric oxide at a temperature in the range of from about 400° to about 500° C. and at a pressure in the range of from about atmospheric to about 200 atmospheres, and recovering the resultant aniline.

8. A process for the preparation of iniline which comprises reacting benzene with anhydrous ammonia in the presence of molybdenum oxide and cupric oxide at a temperature in the range of from about 400° to about 500° C. and at a pressure in the range of from about atmospheric to about 200 atmospheres, and recovering the resultant aniline.

9. A process for the preparation of aniline which comprises reacting benzene with anhydrous ammonia in the presence of molybdenum oxide, air and cupric oxide at a temperature in the range of from about 400° to about 500° C. and at a pressure in the range of from about atmospheric to about 200 atmospheres, and recovering the resultant aniline.

10. A process for the preparation of aniline which comprises reacting benzene with anhydrous ammonia in the presence of a compound of a metal selected from the group consisting of molybdenum, tungsten and chromium and an easily reducible oxide of a metal selected from the group consisting of copper, iron, nickel, silver and gold at a temperature in the range of from about 200° to about 600° C. and at a pressure in the range of from about atmospheric to about 200 atmospheres, and recovering the resultant aniline.

References Cited in the file of this patent

UNITED STATES PATENTS

| | | |
|---|---|---|
| 2,001,284 | Prahl et al. | May 14, 1935 |
| 2,450,632 | Caldwell et al. | Oct. 5, 1948 |
| 2,501,509 | Gresham et al. | Mar. 21, 1950 |
| 2,591,493 | Arnold et al. | Apr. 1, 1952 |

OTHER REFERENCES

Smialkowski: Chemical Abstracts, vol. 24, page 80[2] (1930).

Plate et al.: Chemical Abstracts, vol. 49, page 13126c (1955).